(12) United States Patent
Nakamura (10) Patent No.: US 12,459,384 B2
(45) Date of Patent: Nov. 4, 2025

(54) POWER SUPPLY SYSTEM, POWER SUPPLY FACILITY, AND POWER SUPPLY METHOD (71) Applicant: TOYOTA JIDOSHA KABUSHIKI KAISHA, Toyota (JP)

(72) Inventor: Masateru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 695 days.

(21) Appl. No.: 17/859,482

(22) Filed: Jul. 7, 2022

(65) Prior Publication Data
US 2023/0064219 A1 Mar. 2, 2023

(30) Foreign Application Priority Data
Aug. 27, 2021 (JP) .................. 2021-138780

(51) Int. Cl.
*B60L 53/30* (2019.01)
*B60L 53/35* (2019.01)
*H02J 7/00* (2006.01)
*H02P 29/00* (2016.01)

(52) U.S. Cl.
CPC ............ *B60L 53/305* (2019.02); *B60L 53/35* (2019.02); *H02J 7/0042* (2013.01); *H02P 29/00* (2013.01)

(58) Field of Classification Search
CPC ...... B60L 53/305; B60L 53/35; H02J 7/0042; H02P 29/00
USPC ....................................................... 320/109
See application file for complete search history.

(56) References Cited

U.S. PATENT DOCUMENTS

| 5,974,743 A * | 11/1999 | Vaia ................... E04B 1/34363 52/169.1 |
| 2013/0307477 A1* | 11/2013 | Reinschke ............. B60L 53/30 320/109 |
| 2015/0306974 A1* | 10/2015 | Mardall .............. H01M 10/625 429/120 |
| 2016/0207406 A1* | 7/2016 | Kauffmann ............. B60L 53/30 |
| 2017/0366024 A1* | 12/2017 | Chen ..................... B60L 53/305 |
| 2018/0253972 A1 | 9/2018 | Nishida et al. |

(Continued)

FOREIGN PATENT DOCUMENTS

| CN | 108539807 A | 9/2018 |
| CN | 110481371 A | 11/2019 |

(Continued)

*Primary Examiner* — Jack Chiang
*Assistant Examiner* — Suchin Parihar
(74) *Attorney, Agent, or Firm* — Sughrue Mion, PLLC (57) ABSTRACT

A power supply system includes charging stands capable of supplying electric power to an electrified vehicle on the ground and each including a power supply unit, a movable unit including the power supply unit and moving between a first position at which the power supply unit is housed underground and a second position at which the power supply unit is exposed from the ground, an actuator moving the movable unit, and a control unit controlling the actuator. The control unit controls the actuator to lower the movable unit to the first position when supply of electric power to a next electrified vehicle is not scheduled within a predetermined period after the supply of electric power and controls the actuator to maintain the movable unit at the second position when supply of electric power to a next electrified vehicle is scheduled within the predetermined period after the supply of electric power.

7 Claims, 5 Drawing Sheets

(56) References Cited

U.S. PATENT DOCUMENTS

| | | | |
|---|---|---|---|
| 2020/0180456 A1* | 6/2020 | Kauffmann | B60L 53/30 |
| 2021/0252989 A1* | 8/2021 | Price | B60L 53/31 |
| 2022/0388482 A1* | 12/2022 | Kinomura | B60L 53/60 |
| 2023/0322106 A1* | 10/2023 | Lopez | B60L 53/16 |
| | | | 320/109 |
| 2024/0255103 A1* | 8/2024 | Bedell | F25D 19/00 |
| 2024/0286508 A1* | 8/2024 | Boettigheimer | H01F 27/22 |

FOREIGN PATENT DOCUMENTS

| | | | |
|---|---|---|---|
| CN | 111619390 A | 9/2020 |
| CN | 112334358 A | 2/2021 |
| JP | 5475407 B2 | 4/2014 |
| WO | 2019/215423 A1 | 11/2019 |

\* cited by examiner

POWER SUPPLY SYSTEM, POWER SUPPLY FACILITY, AND POWER SUPPLY METHOD

CROSS-REFERENCE TO RELATED APPLICATION

This application claims priority to Japanese Patent Application No. 2021-138780 filed on Aug. 27, 2021, incorporated herein by reference in its entirety.

BACKGROUND

1. Technical Field

The present disclosure relates to a power supply system, a power supply facility, and a power supply method and, more particularly, to a power supply system including a plurality of power supply facilities that can supply electric power to a vehicle on the ground, a power supply facility that can supply electric power to a vehicle on the ground, and a power supply method using a power supply facility that can supply electric power to a vehicle on the ground.

2. Description of Related Art

In the related art, a power supply facility having a configuration in which a charging pole is housed underground when supply of electric power is not performed is known (for example, see Japanese Patent No. 5475407 (JP 5475407 B)).

SUMMARY

In the power supply facility described in JP 5475407 B, it is conceivable that a movable unit such as a charging pole be automatically raised or lowered. In this case, from a point of view of energy saving and decrease of a risk of failure, it is preferable that a raising/lowering operation not be frequently performed.

The present disclosure provides a power supply system, a power supply facility, and a power supply method that can curb frequent execution of a raising/lowering operation.

According to an aspect of the present disclosure, there is provided a power supply system comprising a plurality of power supply facilities that is able to supply electric power to a vehicle on the ground. Each power supply facility includes: a power supply unit configured to supply electric power to the vehicle; a movable unit that includes the power supply unit and is configured to move between a first position at which the power supply unit is housed underground and a second position at which the power supply unit is exposed from the ground; an actuator configured to move the movable unit; and a control unit configured to control the actuator. The control unit is configured to control the actuator such that the movable unit is lowered to the first position based on the premise that there is no schedule for supply of electric power to a next vehicle within a predetermined period after the supply of electric power has ended and to control the actuator such that the movable unit is maintained at the second position based on the premise that there is a schedule for supply of electric power to a next vehicle within the predetermined period after the supply of electric power has ended.

With this configuration, the power supply unit of the power supply facility is lowered to the position at which it is housed underground based on the premise that there is no schedule for supply of electric power to a next vehicle within a predetermined period after the supply of electric power to the vehicle has ended, and the power supply unit of the power supply facility is maintained at the position at which it is exposed from the ground based on the premise that there is a schedule for supply of electric power to a next vehicle within the predetermined period after the supply of electric power to the vehicle has ended. As a result, it is possible to provide a power supply system that can curb frequent execution of a raising/lowering operation.

The control unit may be configured to control the actuator such that the movable unit is raised to the second position based on the premise that a power supply request has been received.

With this configuration, when electric power is supplied to a vehicle, the power supply unit of the power supply facility can be automatically raised to a position at which it is exposed from the ground. As a result, it is possible to switch the power supply unit to a state in which it is exposed from the ground when it is necessary for supply of electric power and to switch the power supply unit to a state in which it is housed underground when it is unnecessary.

The control unit may be configured to control the actuator such that the movable unit is raised based on the premise that a vehicle to be supplied with electric power has been authenticated in addition to the receiving of the power supply request.

With this configuration, when a vehicle to be supplied with electric power has been authenticated, it is possible to switch the power supply unit of the power supply facility to a state in which it is exposed from the ground in order to supply electric power to the vehicle.

The power supply system may further include a server and a communication device of a user of the vehicle. The server may transmit authentication information to the communication device based on the premise that the power supply request has been received from the communication device. The control unit may be configured to determine that the power supply request has been received and the vehicle to be supplied with electric power has been authenticated by receiving the authentication information from the communication device.

With this configuration, it is possible to reliably authenticate a vehicle to be supplied with electric power in order to switch the power supply unit of the power supply facility to a state in which it is exposed from the ground for the purpose of supply of electric power to the vehicle.

The server may transmit guidance information on supply of electric power along with the authentication information to the communication device. The communication device may notify the user of the information on supply of electric power based on the received guidance information.

With this configuration, it is possible to reliably authenticate a vehicle to be supplied with electric power and to notify a user of information on supply of electric power.

The server may perform a process of settling a charge for supply of electric power based on the premise that the power supply request has been received from the communication device.

With this configuration, when a vehicle is supplied with electric power using the power supply facility, it is possible to reliably settle a charge for supply of electric power with a user of the vehicle.

According to another aspect of the present disclosure, there is provided a power supply facility that is able to supply electric power to a vehicle on the ground, the power supply facility including: a power supply unit configured to supply electric power to the vehicle; a movable unit that includes the power supply unit and is configured to move between a first position at which the power supply unit is housed underground and a second position at which the power supply unit is exposed from the ground; an actuator configured to move the movable unit; and a control unit configured to control the actuator. The control unit is configured to control the actuator such that the movable unit is lowered to the first position based on the premise that there is no schedule for supply of electric power to a next vehicle within a predetermined period after the supply of electric power has ended and to control the actuator such that the movable unit is maintained at the second position based on the premise that there is a schedule for supply of electric power to a next vehicle within the predetermined period after the supply of electric power has ended.

With this configuration, it is possible to provide a power supply facility that can curb frequent execution of a raising/lowering operation.

According to another aspect of the present disclosure, there is provided a power supply method using a power supply facility that is able to supply electric power to a vehicle on the ground. The power supply facility includes: a power supply unit configured to supply electric power to the vehicle; a movable unit that includes the power supply unit and is configured to move between a first position at which the power supply unit is housed underground and a second position at which the power supply unit is exposed from the ground; an actuator configured to move the movable unit; and a control unit configured to control the actuator. The power supply method includes: a step of causing the control unit to control the actuator such that the movable unit is lowered to the first position based on the premise that there is no schedule for supply of electric power to a next vehicle within a predetermined period after the supply of electric power has ended; and a step of causing the control unit to control the actuator such that the movable unit is maintained at the second position based on the premise that there is a schedule for supply of electric power to a next vehicle within the predetermined period after the supply of electric power has ended.

With this configuration, it is possible to provide a power supply method that can curb frequent execution of a raising/lowering operation.

According to the present disclosure, it is possible to provide a power supply system, a power supply facility, and a power supply method that can curb frequent execution of a raising/lowering operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the accompanying drawings. The same or corresponding elements in the drawings will be referred to by the same reference signs and description thereof will not be repeated.

Figure 1:
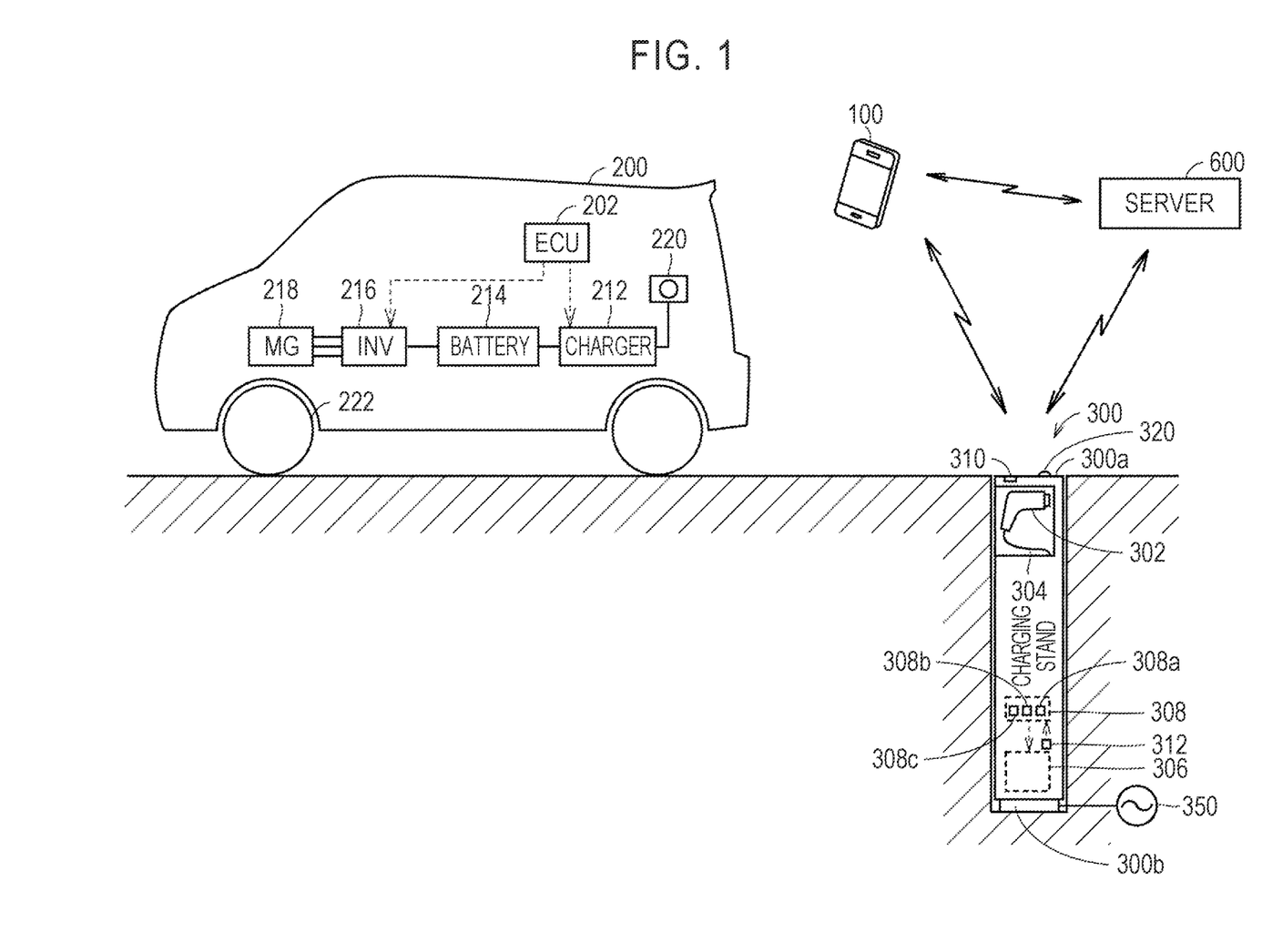
FIG. 1 is a diagram illustrating an example of a configuration of an electrified vehicle and a charging stand in a state in which a movable unit is housed underground.
Figure 2:
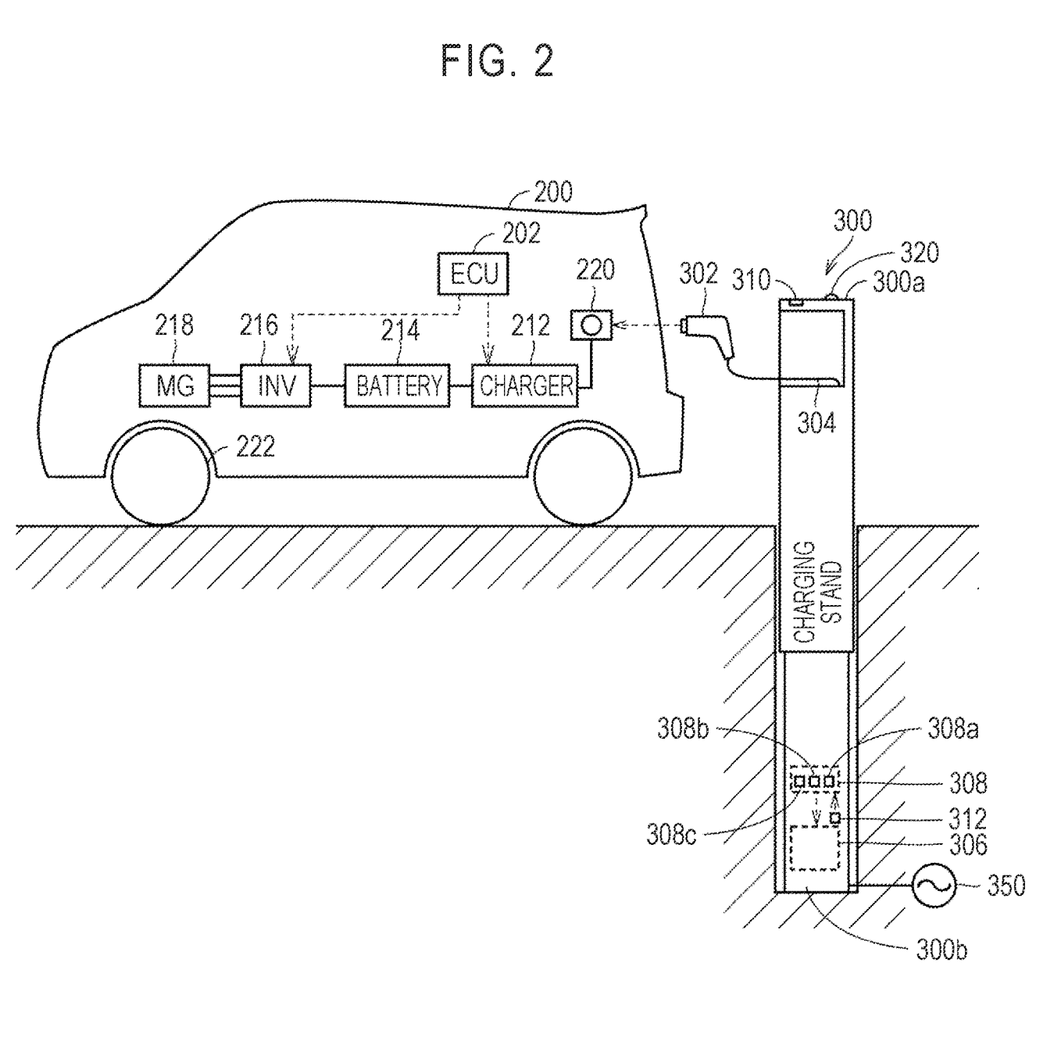
FIG. 2 is a diagram illustrating an example of a configuration of the electrified vehicle and the charging stand in a state in which the movable unit is exposed from the ground.

In the following description, a configuration of a charging stand 300 which is a charging facility according to an embodiment of the present disclosure will be exemplified. FIG. 1 is a diagram illustrating an example of a configuration of an electrified vehicle 200 and a charging stand 300 in a state in which a movable unit 300a (which will be described later) is housed underground. FIG. 2 is a diagram illustrating an example of a configuration of an electrified vehicle 200 and a charging stand 300 in a state in which the movable unit 300a is exposed from the ground.

As illustrated in FIGS. 1 and 2, the charging stand 300 is configured to be raised and lowered between a lowest state in which a position of an upper end thereof is substantially flush with the ground and the movable unit 300a is housed underground (see FIG. 1) and a highest state in which the upper end is raised to a predetermined position on the ground and the movable unit 300a is exposed (see FIG. 2).

The charging stand 300 includes, for example, a cylindrical housing and is installed on the bottom of a recessed portion formed in the ground. The recessed portion formed in the ground is formed to have a predetermined gap from an outer circumferential surface of the housing of the charging stand 300. The depth of the recessed portion is substantially equal to a length in the vertical direction of the charging stand 300 in the lowest state.

The charging stand 300 includes a movable unit 300a and a fixed unit 300b. A housing space in which a connector 302 can be housed is formed in an upper part of the movable unit 300a. One end of a cable 304 is connected to the connector 302. The other end of the cable 304 is connected to a power supply circuit which is not illustrated. The power supply circuit is configured to be supplied with AC electric power from a power supply 350 and supply electric power to the movable unit 300a (more specifically, the cable 304). The power supply 350 is, for example, an AC power supply configured as a commercial power supply. The cable 304 has, for example, a formative extensible portion including a curled part or a structural extensible portion including a winding structure and is configured to extend to an inlet 220 of an electrified vehicle 200 parking in a parking space when the connector 302 is taken out.

A touch sensor 310 and an alarm lamp 320 are provided in the movable unit 300a. The touch sensor 310 is a detection device that detects a touch of an object (for example, a person, a living thing, or a thing) with the movable unit 300a of the charging stand 300 and is configured as, for example, an electrostatic sensor. The electrostatic sensor detects an object based on a change in capacitance when an object enters an electric field generated by the electrostatic sensor. A plurality of electrostatic sensors may be provided in parts of the movable unit 300a according to necessity for detecting a touch of an object with a detection part (for example, a top surface or a side surface) of the movable unit 300a. The touch sensor 310 includes one or more electrostatic sensors. That is, when it is detected that an object touches the movable unit 300a, the touch sensor 310 transmits a signal indicating that the object touches the movable unit 300a to a control device 308. The touch sensor 310 is not limited thereto but may be another type of sensor as long as it is a sensor that can detect that an object touches the movable unit 300a. The touch sensor 310 is provided to make it difficult to erroneously detect a touch of an object.

The alarm lamp 320 is configured as a light emitting device, for example, a multi-color light emitting diode (LED), and is controlled by the control device 308 such that it is turned on, made to blink, or turned off to be visible by persons near the charging stand 300. For example, the alarm lamp 320 may be controlled such that it is flickered in green while charging is being performed or is turned on in blue when charging has been completed.

The alarm lamp 320 may be controlled such that it is turned on or flickered in red when a touch of an object is detected.

The fixed unit 300b is fixed to the bottom of the recessed portion formed in the ground. The fixed unit 300b may be fixed to any part of the recessed portion formed in the ground, but is not limited to fixation to the bottom of the recessed portion.

The fixed unit 300b includes a lifting device 306 that raises or lowers the movable unit 300a in the vertical direction, a control device 308 that controls the operation of the lifting device 306, and a movement sensor 312.

The lifting device 306 includes an actuator that raises and lowers the movable unit 300a. For example, the lifting device 306 may employ a rack-and-pinion type mechanism, a mechanism using a hydraulic cylinder or a pneumatic cylinder, or a mechanism using a magnetic force. The rack-and-pinion type mechanism rotates a pinion gear engaging with a rack gear fixed to the movable unit 300a using an electric actuator to raise or lower the movable unit 300a. The mechanism using a hydraulic cylinder or a pneumatic cylinder fixes a rod connected to a piston to the movable unit 300a and increases or decreases a hydraulic pressure or a pneumatic pressure supplied to a cylinder body fixed to the fixed unit 300b to raise or lower the movable unit 300a. The mechanism using a magnetic force generates a magnetic repulsive force between the movable unit 300a and the fixed unit 300b to raise or lower the movable unit 300a.

The lifting device 306 is configured such that the movable unit 300a is not lowered below a position corresponding to the lowest state, for example, using a stopper mechanism and is configured such that the movable unit 300a is not raised above a position corresponding to the highest state.

The movement sensor 312 detects a moving quantity of the movable unit 300a. The movement sensor 312 detects, for example, a lifting quantity of the movable unit 300a using the lifting device 306 as the moving quantity of the movable unit 300a. The movement sensor 312 transmits a signal indicating the detected moving quantity of the movable unit 300a to the control device 308. For example, the movement sensor 312 may detect a state quantity corresponding to the lifting quantity such as an amount of operation of the actuator, and the control device 308 may acquire the lifting quantity from the detected state quantity.

The control device 308 includes a central processing unit (CPU) 308a, a memory 308b including a read only memory (ROM) and a random access memory (RAM), and a communication unit 308c that can communicate with an external device. The control device 308 controls electronic devices (for example, the lifting device 306) provided in the charging stand 300 based on information stored in the memory 308b, information received via the communication unit 308c, information acquired from the touch sensor 310, information acquired from the movement sensor 312, and/or other information acquired from sensors which are not illustrated. This control is not limited to a configuration in which software processes are performed by the CPU 308a, but may be performed by employing dedicated hardware (an electronic circuit).

The communication unit 308c is configured to transmit and receive various types of information to and from an external device outside of the charging stand 300. In this embodiment, the communication unit 308c is configured to perform radio communication with a server 600 that manages a plurality of charging stands 300. The communication unit 308c is configured to communicate with a communication device 100 which is owned by a user of an electrified vehicle 200. The communication device 100 is, for example, a mobile terminal such as a smartphone or a tablet. Communication between the communication unit 308c and the communication device 100 may be, for example, short-range radio communication. That is, a communication-possible distance between the communication unit 308c and the communication device 100 is shorter than a communication-possible distance between the communication unit 308c and the server 600.

For example, when execution conditions of raising control (hereinafter also referred to as "raising conditions") are satisfied, the control device 308 performs raising control in the lifting device 306 such that the corresponding charging stand 300 is switched from the lowest state to the highest state. The execution conditions of raising control include, for example, a condition that the charging stand 300 is not in the highest state and a condition that an execution request for raising control (hereinafter also referred to as a "raising request") is received from the server 600. The server 600 transmits the raising request to the charging stand 300, for example, when a start time included in a reservation for use of the charging stand 300 comes.

For example, when execution conditions of raising control are satisfied, the control device 308 performs lowering control in the lifting device 306 such that the charging stand 300 is switched from the highest state to the lowest state. The execution conditions of lowering control include, for example, a condition that the corresponding charging stand 300 is not in the lowest state and a condition that an execution request for lowering control (hereinafter also referred to as a "lowering request") is received from the server 600. A condition that charging of the electrified vehicle 200 (specifically a battery 214 which will be described later) has been completed may be employed instead of the condition that the lowering request is received. Completion of charging may mean, for example, a state in which the connector 302 and the inlet 220 of the electrified vehicle 200 are disconnected and the connector 302 has been returned to a predetermined position.

An example of a configuration of an electrified vehicle 200 parking in a parking space and being able to be charged by a charging stand 300 is additionally illustrated in FIGS. 1 and 2. As illustrated in FIGS. 1 and 2, examples of the electrified vehicle 200 include vehicles in which a power storage device is mounted such as a plug-in hybrid electric vehicle (PHEV) and a battery electric vehicle (BEV). The electrified vehicle 200 is not limited to the vehicles described above as long as it has a configuration in which it can be supplied with electric power from a charging stand 300, and may be, for example, a vehicle in which a power storage device for supplying electric power to the outside is mounted.

The electrified vehicle 200 includes an electronic control unit (ECU) 202, a charger 212, a battery 214, an inverter 216, a motor generator 218, and an inlet 220.

The ECU 202 includes a CPU and a memory including a ROM and a RAM. The ECU 202 controls electrical devices (for example, the charger 212 and the inverter 216) that are provided in the electrified vehicle 200 based on information stored in the memory or information acquired from sensors which are not illustrated.

When AC electric power is supplied from the inlet 220, the charger 212 converts the supplied AC electric power to DC electric power and supplies the DC electric power to the battery 214. The battery 214 is charged by causing the charger 212 to operate. The charger 212 is controlled, for example, in accordance with a control signal from the ECU 202.

The battery 214 is, for example, a power storage element that is configured to be rechargeable and representatively employs a secondary battery such as a nickel-hydride battery or a lithium-ion battery containing a liquid or solid electrolyte. Alternatively, the battery 214 has only to be a power storage device that can store electric power and, for example, a large-capacity capacitor may be used instead of the battery 214.

For example, the inverter 216 converts DC electric power of the battery 214 to AC electric power and supplies the AC electric power to the motor generator 218. For example, the inverter 216 converts AC electric power (regenerated electric power) from the motor generator 218 to DC electric power and supplies the DC electric power to the battery 214 to charge the battery 214.

The motor generator 218 is supplied with electric power from the inverter 216 and applies a rotational force to driving wheels 222. The driving wheels 222 rotate with the rotational force applied from the motor generator 218 and cause the electrified vehicle 200 to travel.

The inlet 220 is provided in an exterior part of the electrified vehicle 200 along with a cover such as a lid (not illustrated). The inlet 220 is a power receiving portion that is supplied with charging electric power from an external charging facility (for example, a charging stand 300). The inlet 220 has a shape to which the connector 302 of the charging stand 300 can be attached. Contacts are incorporated into both the inlet 220 and the connector 302, the contacts come into contact when the connector 302 is attached to the inlet 220, and thus the inlet 220 and the connector 302 are electrically connected. At this time, the battery 214 of the electrified vehicle 200 can be charged with electric power supplied from the charging stand 300.

Figure 3:
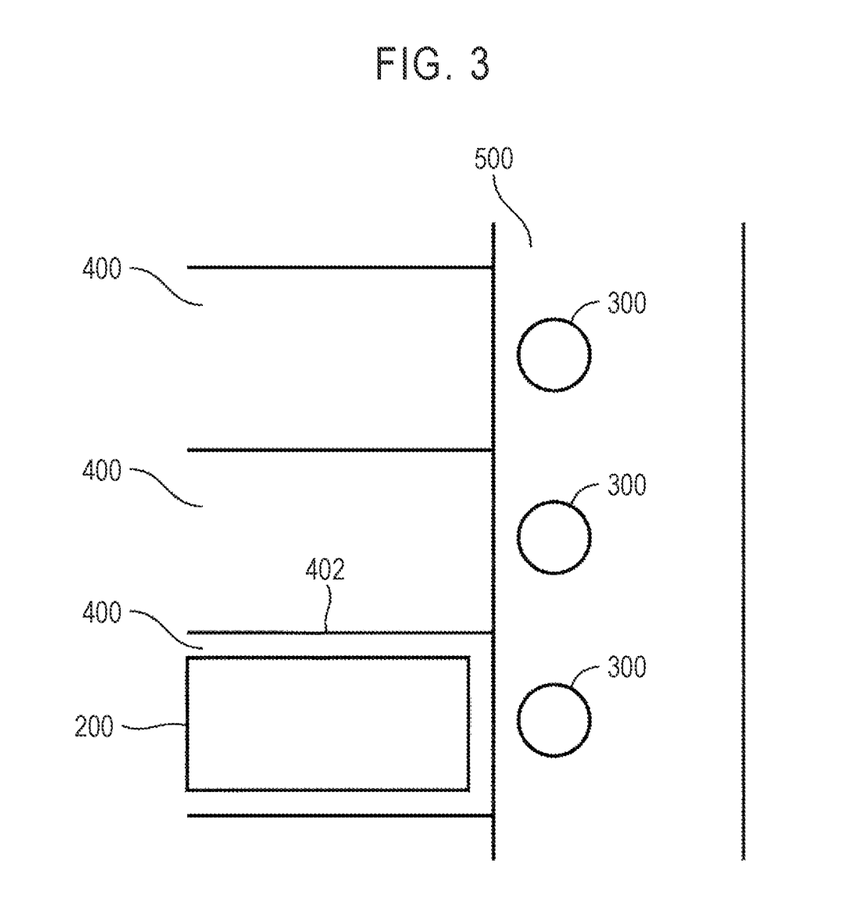
FIG. 3 is a diagram illustrating an example of a layout of a charging stand and a parking space.

FIG. 3 is a diagram illustrating an example of a layout of charging stands 300 and parking spaces 400. Referring to FIG. 3, in this example, a plurality of parking spaces 400 are set side by side by boundary lines 402 in a parking lot. A walkway 500 is provided in a lateral direction (a direction perpendicular to a longitudinal direction) of the parking spaces 400. The walkway 500 is adjacent to the parking spaces 400. Charging stands 300 are installed at positions of the walkway 500 adjacent to the parking spaces 400. A charging stand 300 is provided for each parking space 400. The charging stands 300 are arranged along the walkway 500.

Figure 4:
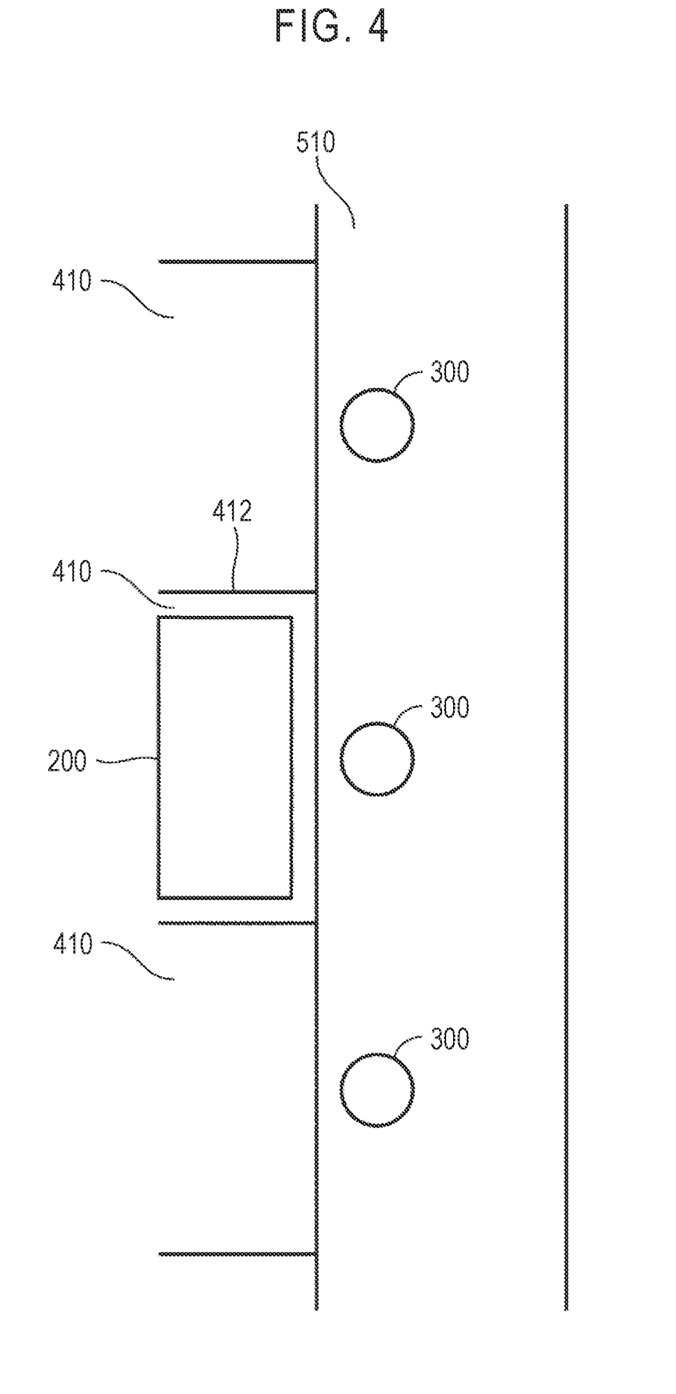
FIG. 4 is a diagram illustrating another example of a layout of a charging stand and a parking space.

FIG. 4 is a diagram illustrating another example of the layout of charging stands 300 and parking spaces 400. Referring to FIG. 4, in this example, a plurality of parking spaces 410 are set in a longitudinal direction by boundary lines 412 in a parking lot. A walkway 510 is provided in a longitudinal direction of the parking spaces 410. The walkway 510 is adjacent to the parking spaces 410. Charging stands 300 are installed at positions of the walkway 510 adjacent to the parking spaces 410. A charging stand 300 is provided for each parking space 410. The charging stands 300 are arranged along the walkway 510.

A user parks an electrified vehicle 200 in a parking space 400 or a parking space 410, and takes out the connector 302 from a nearest charging stand 300 and connects the connector 302 to the inlet 220 of the electrified vehicle 200 when the charging stand 300 is in the highest state. Accordingly, the electrified vehicle 200 can be charged with electric power from the charging stand 300.

Referring back to FIGS. 1 and 2, the server 600 includes a control device, a storage device, and a communication device (none of which are illustrated). The control device includes a processor and is configured to perform predetermined information processing. The storage device is configured to store various types of information. The communication device includes various communication I/F. The communication device is configured to communicate with the communication device 100 and the charging stands 300, and the control device is configured to communicate with the communication device 100 and the charging stand 300 via the communication device. That is, the server 600 is configured to communicate with the communication device 100 and the charging stands 300.

Users of a plurality of electrified vehicles 200 and a plurality of charging stands 300 are registered in the server 600. Communication devices 100 of the users are also registered along with the users in the server 600. The server 600 is configured to manage information of the registered users (hereinafter also referred to as "user information) and information of the registered charging stands (hereinafter also referred to as "stand information"). Information of the communication devices is included in the user information. The user information may include information of the electrified vehicles 200 owned by the user (for example, specification information associated with charging). The user information and the stand information are stored in the storage device of the server 600.

Identification information for identifying each user (hereinafter also referred to as "user IDs") is given to the corresponding users, and the server 600 manages the user information separately for each user ID. Each user ID also serves as information for identifying the corresponding communication device 100 (a device ID). For example, the user information includes a communication address of the communication device 100 owned by each user and information for identifying an electrified vehicle 200 belonging to the user (a vehicle ID).

The communication device 100 is a mobile terminal which is carried by a user of each electrified vehicle 200. A smartphone, a tablet terminal, or a wearable device (for example, a smart watch) can be employed as the communication device 100.

The communication device 100 is configured to perform radio communication with the charging stands 300 and the server 600. Predetermined application software (hereinafter also simply referred to as an "application") is installed in the communication device 100. The communication device 100 is carried by a user of an electrified vehicle 200 and can exchange information with the charging stands 300 and the server 600 via the application. Each user can operate the application, for example, using a touch panel display of the communication device 100.

A user can reserve a charging stand 300 by communicating with the server 600 using the application and inputting reservation information. The reservation information includes information for identifying the charging stand and a charging start time. The server 600 having received the reservation information from the communication device 100 transmits a raising request to the charging stand 300. The server 600 may transmit the raising request to the charging stand 300 at a timing at which a time a predetermined time prior to the charging start time has come. The raising request includes the user ID of the user who has reserved the charging stand 300 (a device ID).

As described above, when the movable unit 300a is configured to be automatically raised and lowered in the charging stand 300, it is preferable that the raising/lowering operation not be frequently performed from a point of view of energy saving and decrease of a risk of failure.

Therefore, in this embodiment, the control device 308 controls the actuator of the lifting device 306 such that the movable unit 300a is lowered to a position at which the power supply unit (for example, the connector 302 connected to a vehicle and a connection port on the movable unit 300a side to which the cable 304 is connected) is housed underground based on the premise that there is no schedule for supply of electric power to a next electrified vehicle 200 within a predetermined period after the supply of electric power has ended, and controls the actuator of the lifting device 306 such that the movable unit 300a is maintained at a position at which the power supply unit is exposed from the ground based on the premise that there is a schedule for supply of electric power to a next electrified vehicle 200 within the predetermined period after the supply of electric power has ended.

Accordingly, the movable unit is lowered to the position at which the power supply unit of the charging stand 300 is housed underground based on the premise that there is no schedule for supply of electric power to a next electrified vehicle 200 within the predetermined period after the supply of electric power to the electrified vehicle 200 has ended, and the movable unit is maintained at the position at which the power supply unit is exposed from the ground based on the premise that there is a schedule for supply of electric power to a next electrified vehicle 200 within the predetermined period after the supply of electric power has ended. As a result, it is possible to curb frequent execution of the raising/lowering operation.

Figure 5:
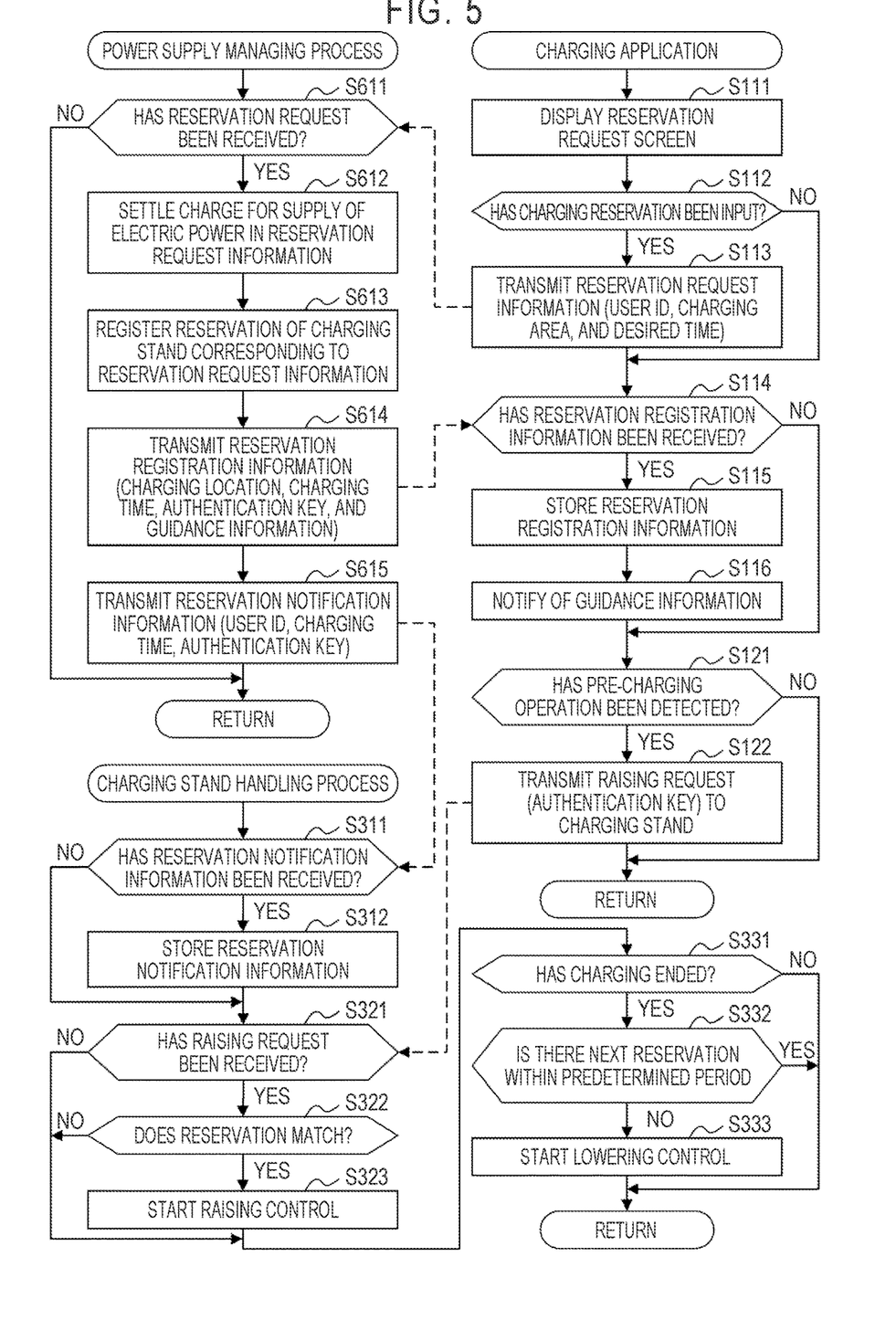
FIG. 5 is a flowchart illustrating a flow of processes for supplying electric power according to an embodiment.

FIG. 5 is a flowchart illustrating a flow of processes for supply of electric power according to this embodiment. Among the processes for supply of electric power, a power supply managing process is called and executed at intervals of a predetermined cycle from a higher-level process by the control device of the server 600. In the process for supply of electric power, a charging application is called and executed at intervals of a predetermined cycle from a higher-level process by a central processing unit (CPU) of the communication device 100. In the process for supply of electric power, a charging stand handling process is called and executed at interval of a predetermined cycle from a higher-level process by the control device 308 of the charging stand 300.

Referring to FIG. 5, the charging application is executed in the communication device 100. In the charging application, the CPU of the communication device 100 displays a request screen for reserving supply of electric power to an electrified vehicle 200 on a touch panel display (Step S111).

Then, the CPU of the communication device 100 determines whether an input of details associated with a charging reservation (for example, a user ID, a region in which charging is desired, and a time at which charging is desired) to the request screen has been detected by the touch panel display (Step S112). When it is determined that a charging reservation has been input (YES in Step S112), the CPU of the communication device 100 transmits reservation request information (for example, information including the user ID, the charging region, and the charging time) to the server 600 (Step S113).

In the power supply managing process, the control device of the server 600 determines whether reservation request information has been received from the communication device 100 (Step S611). When it is determined that reservation request information has been received (YES in Step S611), the control device of the server 600 performs a process of settling a charge for supply of electric power in the reservation request information (Step S612). For example, the control device of the server 600 requests an input of a credit card number for payment from a user and settles a charging for supply of electric power with a credit card company using the credit card number. Alternatively, the control device of the server 600 performs a process of withdrawing the charge for supply of electric power from a bank account of the user of which the account number is registered in advance in the storage device of the server 600.

Then, the control device of the server 600 registers information on a reservation of a charging stand 300 (for example, information including the user ID, the charging start time, a scheduled charging end time, and an authentication key for the charging) corresponding to the region in which charging is desired and which is indicated by the reservation request information in the storage device (Step S613).

Then, the control device of the server 600 transmits reservation registration information (for example, information including the place of the reserved charging stand 300, times associated with charging such as the charging start time and the scheduled charging end time, the authentication key, and guidance information) to the communication device 100 of the user who has performed the reservation (Step S614). The guidance information includes information including a moving image and a still image for guiding a user for a method of operating the charging stand and information for guidance to the reserved charging stand 300 using the navigation system.

The control device of the server 600 transmits reservation notification information (for example, information including the user ID, times associated with charging such as the charging start time and the scheduled charging end time, and the authentication key) to the reserved charging stand 300 (Step S615).

When it is determined that reservation request information has not been received (NO in Step S611) or after the process of Step S615, the control device of the server 600 returns the process flow to a higher-level process which is a call source of the power supply managing process.

When it is determined that a charging reservation has not been input to the charging application (NO in Step S112) or after the process of Step S113, the CPU of the communication device 100 determines whether reservation registration information has been received from the server 600 (Step S114). When it is determined that reservation registration information has been received (YES in Step S114), the CPU of the communication device 100 stores the received reservation registration information in the memory (Step S115).

Then, the CPU of the communication device 100 notifies the user of guidance such as the method of operating the charging stand 300 which is indicated by the guidance information or registers information for guiding the user to the charging stand 300 indicated by the guidance information in the navigation system (Step S116). The user of the electrified vehicle 200 can operate the charging stand 300 in accordance with the guidance. The user of the electrified vehicle 200 can reach the charging stand 300 in accordance with the guidance from the navigation system.

When it is determined that reservation registration information has not been received (NO in Step S114) or after the process of Step S116, the CPU of the communication device 100 determines whether a pre-charging operation has been detected in the touch panel display (Step S121). When it is determined that a pre-charging operation has been detected (YES in Step S121), the CPU of the communication device 100 transmits a raising request of the movable unit 300a including the authentication key, the user ID, and the like stored in the memory to the charging stand 300 (Step S122).

When it is determined that a pre-charging operation has not been detected (NO in Step S121) or after the process of Step S122, the CPU of the communication device 100 returns the process flow to the higher-level process which is a call source of the charging application.

In the charging stand handling process, the CPU 308a of the control device 308 of the charging stand 300 determines whether reservation notification information has been received from the server 600 (Step S311). When it is determined that reservation notification information has been received (YES in Step S311), the CPU 308a stores the received reservation notification information in the RAM of the memory 308b (Step S312).

When it is determined that reservation notification information has not been received (NO in Step S311) or after the process of Step S312, the CPU 308a determines whether a raising request has been received from the communication device 100 (Step S321). When it is determined that a raising request has been received (YES in Step S321), the CPU 308a determines whether the reservation notification information including an authentication key corresponding to the authentication key included in the received raising request is stored in the memory 308b (Step S322).

When it is determined that reservation notification information including the authentication key corresponding to the received authentication key is stored (YES in Step S322), the CPU 308a controls the lifting device 306 such that raising control of the movable unit 300a is started (Step S323). When the power supply unit for supplying electric power to the electrified vehicle 200 (for example, the connector 302 connected to the electrified vehicle 200, which may be the connection port of the movable unit 300a side to which the cable 304 is connected) in the movable unit 300a reaches the position corresponding to the highest state which the power supply unit is exposed from the ground, the lifting device 306 is controlled such that the raising control of the movable unit 300a ends.

When the raising control of the movable unit 300a ends, the user connects the connector 302 of the charging stand 300 to the inlet 220 of the electrified vehicle 200 and operates the charging stand 300 such that supply of electric power to the electrified vehicle 200 is started. When the charging ends, supply of the electric power to the electrified vehicle 200 is stopped. When stopping of the supply of electric power is ascertained, the user detaches the connector 302 from the inlet 220 and returns the connector 302 to the charging stand 300.

The CPU 308a determines whether the charging has ended by determining whether the connector 302 has been detached from the inlet 220 and returned to the charging stand 300 (Step S331). When it is determined that the charging has ended (YES in Step S331), the CPU 308a determines whether there is no reservation notification information including a charging start time within a predetermined period (for example, a period of about several minutes to several hours, specifically, 10 minutes or 1 hour) from the time at which the charging had ended in the reservation notification information stored in the memory 308b (Step S332). When it is determined that there is no next reservation within the predetermined period (NO in Step S332), the CPU 308a controls the lifting device 306 such that lowering control of the movable unit 300a is started (Step S333). When the power supply unit of the movable unit 300a reaches the position corresponding to the lowest state in which it is housed underground, the lifting device 306 is controlled such that the lowering control of the movable unit 300a ends.

When it is determined that the charging has not ended (NO in Step S331) or when it is determined that there is next reservation within the predetermined period (YES in Step S332), the lifting device 306 is controlled such that the movable unit 300a is maintained at the position corresponding to the highest state. Thereafter or after Step S333, the CPU 308a returns the process flow to the higher-level process which is a call source of the charging stand handling process.

MODIFIED EXAMPLES (1) In the aforementioned embodiment, as illustrated in FIG. 1, the cable 304 of the charging stand 300 is normally connected to the power supply circuit of the charging stand 300. Not limited thereto, a connection portion for connection to the cable 304 may be provided in the movable unit 300a of the charging stand 300, and one end of the cable 304 having the connector 302 at the other end may be able to be connected to the connection portion.

(2) In the aforementioned embodiment, as illustrated in Steps S331 to S333 in FIG. 5, when charging has ended and there is a next reservation within the predetermined period, lowering control of the movable unit 300a of the charging stand 300 is not started in Step S333 and the actuator of the lifting device 306 is controlled such that the movable unit 300a is maintained at the position corresponding to the highest state. However, when charging to a next electrified vehicle 200 is not started at a next reserved start time, lowering control of the movable unit 300a may be started.

(3) In the aforementioned embodiment, as illustrated in FIG. 5, a charging reservation for a charging stand 300 is performed on the server 600 by a user's communication device 100. Not limited thereto, the user's communication device 100 may directly perform a charging reservation for a charging stand 300.

(4) In the aforementioned embodiment, as illustrated in FIG. 5, payment of a charging for supply of electric power is performed before charging of an electrified vehicle 200 is started. Not limited thereto, payment for a charge for supply of electric power may be performed after charging of an electrified vehicle 200 has been performed.

(5) In the aforementioned embodiment, electric power supplied from the charging stand 300 to the electrified vehicle 200 is AC electric power as illustrated in FIG. 1, but the disclosure is not limited thereto and it may be DC electric power.

(6) The aforementioned embodiment can be understood as disclosure of a power supply facility such as a charging stand 300, can also be understood as disclosure of a power supply system including power supply facilities and the server 600 or a power supply system including power supply facilities, the server 600, and communication devices 100, or can also be understood as disclosure of a control method or a control program for a power supply facility or a power supply system.

CONCLUSION (1) As illustrated in FIGS. 1 and 2, the power supply system is a power supply system including a plurality of charging stands 300 that is able to supply electric power to an electrified vehicle 200 on the ground. Each charging stand 300 includes the power supply unit (for example, the connector 302 to be connected to a vehicle and a connection port of the movable unit 300*a* side to be connected to the cable 304) for supplying electric power to the electrified vehicle 200, the movable unit 300*a* that includes the power supply unit and is able to moves between a first position in which the power supply unit is housed underground (for example, a position corresponding to the lowest state) and a second position at which the power supply unit is exposed from the ground (for example, the position corresponding to the highest state), the actuator that moves the movable unit 300*a* (for example, the actuator of the lifting device 306), and the control device 308 that controls the actuator. As illustrated in FIG. 5, the control device 308 controls the actuator such that the movable unit is lowered to the first position based on the premise that there is no schedule for supply of electric power to a next electrified vehicle 200 within the predetermined period after the supply of electric power has ended (for example, Step S333), and controls the actuator such that the movable unit 300*a* is maintained at the second position based on the premise that there is a schedule for supply of electric power to a next electrified vehicle 200 within the predetermined period after the supply of electric power has ended (for example, execution of the process of Step S333 is prohibited).

Accordingly, the power supply unit of the charging stand 300 is lowered to the position at which the power supply unit is housed underground based on the premise that there is no schedule for supply of electric power to a next electrified vehicle 200 within the predetermined period after the supply of charging to the electrified vehicle 200 has ended, and the power supply unit is maintained at the position at which the power supply unit is exposed from the ground based on the premise that there is a schedule for supply of electric power to a next electrified vehicle 200 within the predetermined period after the supply of electric power has ended. As a result, it is possible to curb frequent execution of the raising/lowering operation.

(2) As illustrated in FIG. 5, the control device 308 may control the actuator such that the movable unit 300*a* is raised to the second position (for example, Step S323) based on the premise that a power supply request has been received (for example, Step S321).

Accordingly, when an electrified vehicle 200 is supplied with electric power, the power supply unit of the charging stand 300 can be automatically raised to the position at which it is exposed from the ground. As a result, it is possible to switch the power supply unit to the state in which it is exposed from the ground when it is necessary for supply of electric power and to switch the power supply unit to the state in which it is housed underground when it is unnecessary.

(3) As illustrated in FIG. 5, the control device 308 may control the actuator such that the movable unit 300*a* is raised based on the premise that an electrified vehicle 200 to be supplied with electric power has been authenticated in addition to the receiving of the power supply request (for example, Step S322).

Accordingly, when an electrified vehicle 200 to be supplied with electric power has been authenticated, it is possible to switch the power supply unit of the charging stand 300 to the state in which it is exposed from the ground in order to supply electric power to the electrified vehicle 200.

(4) As illustrated in FIG. 1, the power supply system may further include the server 600 and the communication device 100 of a user of the electrified vehicle 200. As illustrated in FIG. 5, the server 600 may transmit authentication information to the communication device 100 (for example, Step S614) based on the premise that the power supply request has been received from the communication device 100. The control device 308 may determine that the power supply request has been received and the electrified vehicle 200 to be supplied with electric power has been authenticated (for example, Step S321) by receiving the authentication information from the communication device 100.

Accordingly, it is possible to reliably authenticate an electrified vehicle 200 to be supplied with electric power in order to switch the power supply unit of the charging stand 300 to the state in which it is exposed from the ground for the purpose of supply of electric power to the electrified vehicle 200.

(5) As illustrated in FIG. 5, the server 600 may transmit guidance information on supply of electric power along with the authentication information to the communication device 100 (for example, Step S614). The communication device 100 may notify the user of the information on supply of electric power based on the received guidance information (for example, Step S116).

Accordingly, it is possible to reliably authenticate an electrified vehicle 200 to be supplied with electric power and to notify a user of the information on supply of electric power.

(6) As illustrated in FIG. 5, the server 600 may perform a process of settling a charge for supply of electric power based on the premise that the power supply request has been received from the communication device 100 (for example, Step S612).

Accordingly, when an electrified vehicle 200 is supplied with electric power using the charging stand 300, it is possible to reliably settle a charge for supply of electric power with a user of the electrified vehicle 200.

Parts or all of the aforementioned embodiments may be appropriately combined for realization. It should be noted that the embodiment described above is exemplary and is not restrictive in all respects. The scope of the present disclosure is defined by the appended claims, not by the aforementioned description, and is intended to include all modifications within meanings and ranges equivalent to the claims.

What is claimed is:
1. A power supply system comprising:
a plurality of power supply facilities that is able to supply electric power to a vehicle on the ground;
a server; and
a communication device of a user of the vehicle,
wherein each power supply facility includes:
a power supply unit configured to supply electric power to the vehicle;
a movable unit that includes the power supply unit and is configured to move between a first position at which the power supply unit is housed underground and a second position at which the power supply unit is exposed from the ground;
an actuator configured to move the movable unit; and
a control unit configured to control the actuator,
wherein the server is configured to receive, from the communication device, a power supply request including reservation information that includes a charging start time at which charging of the vehicle by the charging facility is scheduled to start,
wherein the server transmits authentication information to the communication device based on the premise that the power supply request has been received from the communication device, and
wherein the control unit is configured to:
  receive the reservation information from the server,
  based upon a determination that the power supply request has been received and the vehicle to be supplied with electric power has been authenticated by receiving the authentication information from the communication device, control the actuator such that the movable unit is raised to the second position,
  determine whether charging is completed for the vehicle,
  in response to determining that the charging is completed for the vehicle, determine whether a next power supply request has been received that includes reservation information that has a charging start time at which charging of a next vehicle by the charging facility is scheduled to start within a predetermined time period after the charging is completed,
  control the actuator such that the movable unit is lowered to the first position based on the determination that the next power supply request has not been received; and
  control the actuator such that the movable unit is maintained at the second position based on the determination that the next power supply request has been received.

2. The power supply system according to claim 1, wherein the server transmits guidance information on supply of electric power along with the authentication information to the communication device, and
  wherein the communication device notifies the user of the information on supply of electric power based on the received guidance information.

3. The power supply system according to claim 1, wherein the server performs a process of settling a charge for supply of electric power based on the premise that the power supply request has been received from the communication device.

4. The power supply system according to claim 1, wherein the predetermined time period ranges from 10 minutes to one hour.

5. The power supply system according to claim 1, wherein the control unit is configured to determine that the charging is completed when a connector of the power supply unit is detached from a vehicle charger inlet of the vehicle and returned to the power supply unit.

6. A power supply facility that is able to supply electric power to a vehicle on the ground, the power supply facility comprising:
  a power supply unit configured to supply electric power to the vehicle;
  a movable unit that includes the power supply unit and is configured to move between a first position at which the power supply unit is housed underground and a second position at which the power supply unit is exposed from the ground;
  an actuator configured to move the movable unit; and
  a control unit configured to control the actuator,
  wherein the control unit is configured to:
    receive, from a communication device of the vehicle, a power supply request including reservation information that includes a charging start time at which charging of the vehicle by the charging facility is scheduled to start,
    transmit authentication information to the communication device based on the premise that the power supply request has been received from the communication device, and,
    based upon a determination that the power supply request has been received and the vehicle to be supplied with electric power has been authenticated by receiving the authentication information from the communication device, control the actuator such that the movable unit is raised to the second position,
    determine whether charging is completed for the vehicle,
    in response to determining that the charging is completed for the vehicle, determine whether a next power supply request has been received that includes reservation information that has a charging start time at which charging of a next vehicle by the charging facility is scheduled to start within a predetermined time period after the charging is completed, control the actuator such that the movable unit is lowered to the first position based on the determination that the next power supply request has not been received; and
    control the actuator such that the movable unit is maintained at the second position based on the determination that the next power supply request has been received.

7. A power supply method using a power supply facility that is able to supply electric power to a vehicle on the ground; a server; and a communication device of a user of the vehicle,
  wherein the power supply facility includes:
    a power supply unit configured to supply electric power to the vehicle;
    a movable unit that includes the power supply unit and is configured to move between a first position at which the power supply unit is housed underground and a second position at which the power supply unit is exposed from the ground;
    an actuator configured to move the movable unit; and
    a control unit configured to control the actuator,
    wherein the server is configured to receive, from the communication device, a power supply request including reservation information that includes a charging start time at which charging of the vehicle by the charging facility is scheduled to start,
  wherein the server transmits authentication information to the communication device based on the premise that the power supply request has been received from the communication device, and
  wherein the power supply method comprises:
    receiving the reservation information from the server,
    based upon a determination that the power supply request has been received and the vehicle to be supplied with electric power has been authenticated by receiving the authentication information from the communication device, controlling the actuator such that the movable unit is raised to the second position, determining whether charging is completed for the vehicle, in response to determining that the charging is completed for the vehicle, determining whether a next power supply request has been received that includes reservation information that has a charging start time at which charging of a next vehicle by the charging facility is scheduled to start within a predetermined time period after the charging is completed, causing the control unit to control the actuator such that the movable unit is lowered to the first position based on determining that the next power supply request has not been received; and causing the control unit to control the actuator such that the movable unit is maintained at the second position based on the determining that the next power supply request has been received.

* * * * *